May 19, 1925.

H. SCHOON 1,538,749

CULTIVATOR ATTACHMENT

Filed March 6, 1922    2 Sheets-Sheet 1

Harley Schoon
INVENTOR

BY Victor J. Evans
ATTORNEY

May 19, 1925.
H. SCHOON
CULTIVATOR ATTACHMENT
Filed March 6, 1922
1,538,749
2 Sheets-Sheet 2
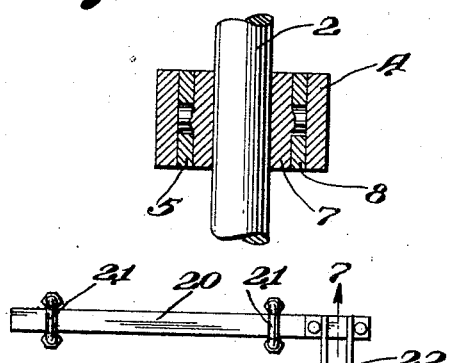
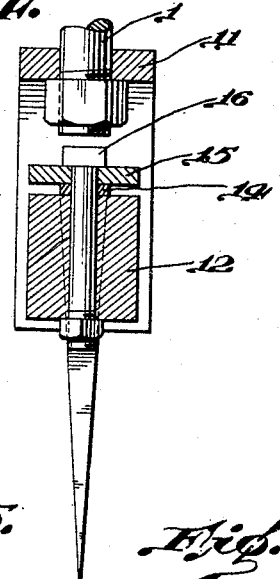
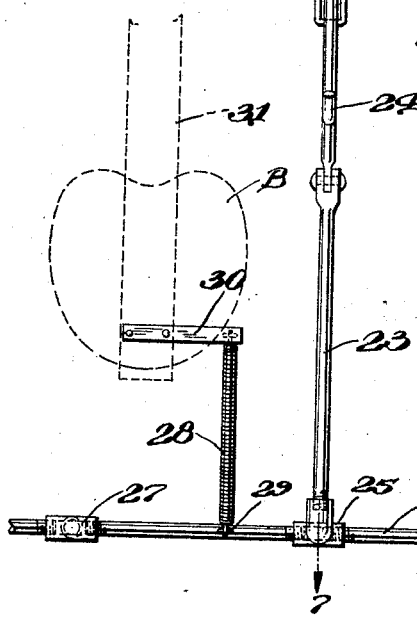
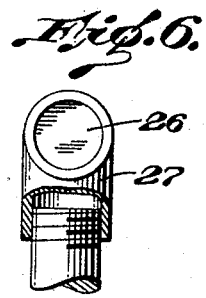
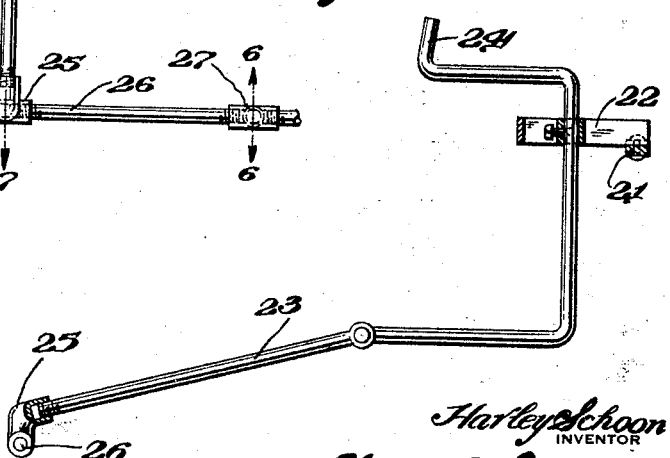
Harley Schoon
INVENTOR
BY Victor J. Evans
ATTORNEY Patented May 19, 1925.

1,538,749

UNITED STATES PATENT OFFICE.

HARLEY SCHOON, OF GLASFORD, ILLINOIS.

CULTIVATOR ATTACHMENT.

Application filed March 6, 1922. Serial No. 541,524.

*To all whom it may concern:*

Be it known that I, HARLEY SCHOON, a citizen of the United States, residing at Glasford, in the county of Peoria and State of Illinois, have invented new and useful Improvements in Cultivator Attachments, of which the following is a specification.

This invention relates to an attachment for cultivators, and an object of the invention is to provide an attachment for single or multiple row cultivators by means of which the corn or produce may be uncovered by a simple movement of the hand of the operator of the machine.

In cultivating relatively young corn, cane, or analogous agricultural produce the soil turned by the cultivating shovels frequently covers the produce and unless it is uncovered the produce either dies or grows crooked, its growth being stunted, and it is the present practice of operators of cultivators to uncover the corn with the foot as he passes it, which takes time, is unsatisfactory in many respects, often resulting in the breaking off the tender plant and at best resulting in incomplete uncovering of the plant.

The present invention comprehends the provision of a device which may be attached to any type of cultivator and includes a rake structure normally held out of operative position which may be easily moved into operative position to uncover a plant by a slight movement of the hand of the operator of the cultivator, and also to provide a device which is constructed to provide a break joint to permit it to move over roots, stones or analogous foreign articles without bending or breaking the attachment.

Other objects of the invention will appear in the following detailed description and in the accompanying drawing wherein:

Fig. 3 is a detail section through the attachment illustrating its manner of connection to a cultivator.

Fig. 4 is a detail vertical cross section through the rake head of the attachment.

Fig. 5 is a top plan of a modified form of the invention as used on a multiple row cultivator.

Fig. 6 is a section on the line 6—6 of Fig. 5.

Fig. 7 is a vertical section through the modified form of cultivator attachment on line 7—7 of Fig. 5.

Figure 1:
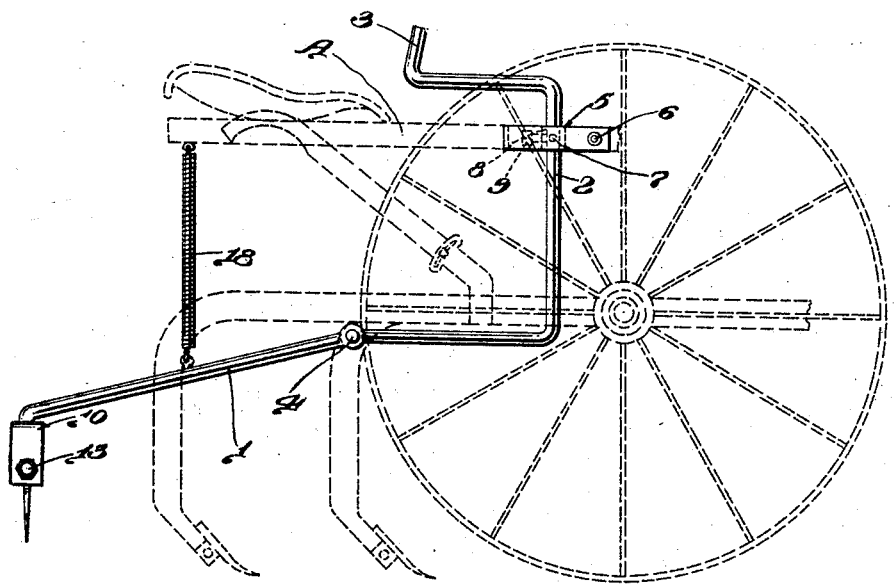
Fig. 1 is a side elevation of the improved attachment used in connection with a one row cultivator.
Figure 2:
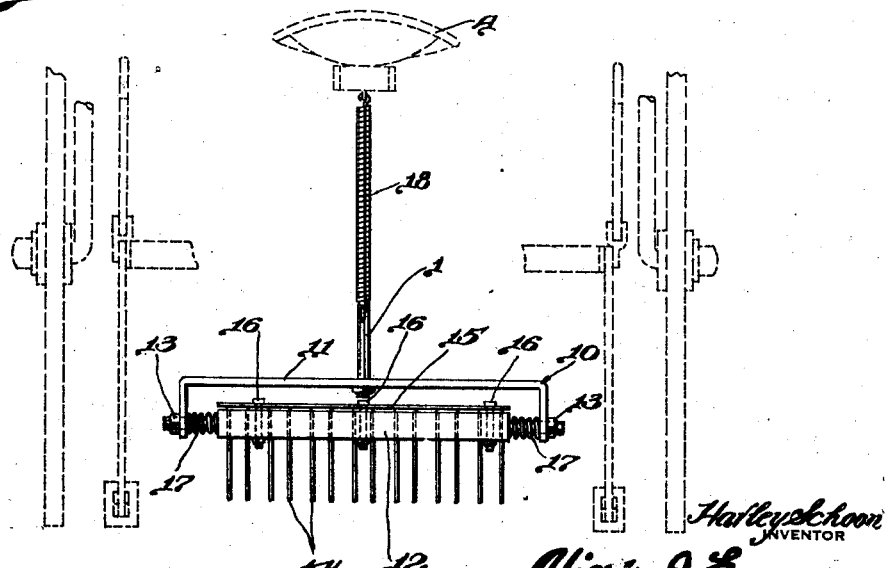
Fig. 2 is a rear elevation of the improved cultivator attachment.

Referring more particularly to the drawings the improved cultivator attachment comprises a rod 1 which is curved to provide a substantially U shaped portion 2 on one end of which a vertically extending handle 3 is mounted. The bar 1 may be composed of two sections connected by means of a coupling 4 if it is so desired, and it is pivotally connected to a cultivator structure A by means of a clamp 5. The clamp 5 includes the means 6 for attaching it to the cultivator and a rod carrying member 7, which is pivotally supported by the supporting member 8 and which receives the rod 1 therethrough. A set screw 9 is carried by the member 7 for clamping the rod 1 in adjusted positions relative to the bracket 5 and consequently to the cultivator structure which limits the throw of the rod 1. A head structure 10 is carried by the end of the rod 1 remote from the handle 3 and it comprises a back 11 to which a tooth carrying rod 12 is pivotally connected by means of trunnion bolts 13. The teeth 14 which are carried by the rod 12, are preferably U shaped being removably inserted through the rod and held in place therein by means of a clamping plate 15 attached to the rod 12 by suitable clamping bolts 16 and engaging the bight portions of the teeth 14 for securely holding them in position relative to the head 12. The teeth 14 are spaced one from the other sufficient distance to permit them to uncover or remove the soil from relatively young plants without rupturing or breaking the plants.

Break springs 17 are provided which have one of their ends connected to the back 11 while the other ends are connected to the rod 12. The break springs 17 normally hold the teeth 14 in substantially vertical position but will permit them to rock together with the rod 12 in case any of the teeth strike a root, rock or other obstruction in their path, to prevent breaking of the teeth.

A contractile spiral spring 18 is connected to the rod 1 intermediate its pivot and the head 10, which spring is also connected to the cultivator in any suitable position. The spring 18 normally holds the head 10 upwardly out of operative position and during the travel of the cultivator A when a young plant is covered by the soil turned by the cultivator the operator merely rocks the rod 1 by means of the handle 3 to move the head 10 downwardly so that the teeth 14 will remove the soil from the plant.

In Figs. 5 to 7 inclusive of the drawing a modified form of the invention is shown which form is adapted for use on multiple row cultivators and comprises an attaching bar 20 which is attached by means of suitable clamp structures 21 to the cultivator frame as shown in dotted line at B. The attaching bar 20 has an attaching bracket structure 22 attached thereto which is similar to the bracket structure 5 and pivotally supports the operating rod 23 upon one end of which the handle 24 is mounted. The operating rod 23 is connected by means of a T coupling 25 to a cross rod 26, the ends of which are externally threaded. T couplings 27 are adjustably mounted upon the threaded ends of the rod 26 and they have a head structure connected thereto similar to the head structures 10. In Figures 5 to 7 the head structures are not shown in that the head structures 10 may be used, the only change being necessary is that a coupling rod be connected to the back 11 for connection with the couplings 27. The couplings 27 may be adjusted inwardly toward or outwardly from the operating rod 23 relative to each other or as desired to regulate the positioning of the head structures carried thereby, to cause the teeth of the head structures to properly engage the soil over growing plants in spaced rows. A contractile spiral spring 28 is connected by means of a clip 29 to the rod 26 and to a bar 30 which is attached to the seat support 31 of the cultivator B and the spring 28 normally holds the cross bar 26 upwardly out of operative position, the latter being moved downwardly into operative position by means of the handle 24 and against the tension of the spring 28. The clip 29 may be adjusted along the rod 26 to regulate the point of connection between the spring 28 and rod 26 and the attaching clamp 22 may also be adjusted longitudinally of the attaching bar 20 as desired, while the rod 23 may be adjusted longitudinally to vary its fulcrum formed by its pivotal connection with the bracket 22.

From the foregoing description taken in connection with the accompanying drawing it will be apparent that a cultivator attachment has been provided which is adaptable for attachment to any conventional type of cultivator and one by means of which young growing plants may be uncovered with accuracy and without liability of injury to the plants.

It is, of course, to be understood that the invention may be constructed in various other manners and the parts associated in different relations and, therefore, I do not desire to be limited in any manner except as set forth in the claim hereunto appended.

Having thus described my invention what I claim is:

A plant uncovering attachment for cultivators comprising an attaching bar, an operating rod connected thereto, a cross rod attached to one end of said operating rod, couplings carried by said cross rod, rake heads carried by said couplings and including inverted U-shaped backs, tooth carrying rods rockably carried by said backs, inverted U-shaped teeth carried by said rods, and pressure plates adjustably connected to said rods and pressing against the bight portions of said teeth to hold them in place.

In testimony whereof I affix my signature.

HARLEY SCHOON.